United States Patent [19]

Smith, Jr.

[11] Patent Number: 5,784,451
[45] Date of Patent: Jul. 21, 1998

[54] VIRTUAL TELEPHONY DATA MESSAGE SYSTEM AND PROCESS

[75] Inventor: Ulysses Grant Smith, Jr., Hillside, N.J.

[73] Assignee: Cogito Economic Systems, Inc., Hillside, N.J.

[21] Appl. No.: 626,986

[22] Filed: Apr. 3, 1996

[51] Int. Cl.$^6$ .............................. H04M 3/00; H04M 3/42; H04M 7/00

[52] U.S. Cl. .......................... 379/265; 379/207; 379/225; 379/230; 379/268; 379/269; 379/309

[58] Field of Search .................... 379/207, 225, 379/229, 230, 231, 232, 233, 234, 265, 266, 309, 219, 220, 268, 269

[56] References Cited

U.S. PATENT DOCUMENTS

| | | | |
|---|---|---|---|
| 5,530,744 | 6/1996 | Charalambous et al. | 379/207 X |
| 5,533,115 | 7/1996 | Hollenbach et al. | 379/266 X |
| 5,546,455 | 8/1996 | Joyce et al. | 379/266 X |

OTHER PUBLICATIONS

ISDN, DECnet, and SNA Communications by Thomas C. Bartee, Howard W. Sams & Company (1989) pp. 22–30.

Primary Examiner—Harry S. Hong
Attorney, Agent, or Firm—Buchanan Ingersoll, P.C.

[57] ABSTRACT

A system and process for accepting, assigning, and delivering telephony communications data between computer telephony integration clients and stored program control point applications through a server-based virtual circuit management system. The virtual circuit management system includes an I/O Vector object array. Objects instantiate uniquely with logical identification properties, telephony data and a vector for data delivery to either clients or applications. The logical identification allows data managed by the virtual circuit management system to be persistent in both the source and destination systems. In this process, bytes of data are read into the object array from the server's operating system's input/output process. Object instances are created within the Vector object array through a process based upon the properties inherited from the data written from the I/O system. The instance provides the logical ID of the origination of the telephony communication data and a vector process instance to be use to deliver the data to its destination. The vector process instance only reads and writes data of its own instance, determined by its logical ID attribute. The vector process writes the data portion of its instance to a different vector object process by that Vector object process's ID. All data written by a vector process is directed to its destination by that logical ID within the virtual circuit management system.

20 Claims, 10 Drawing Sheets

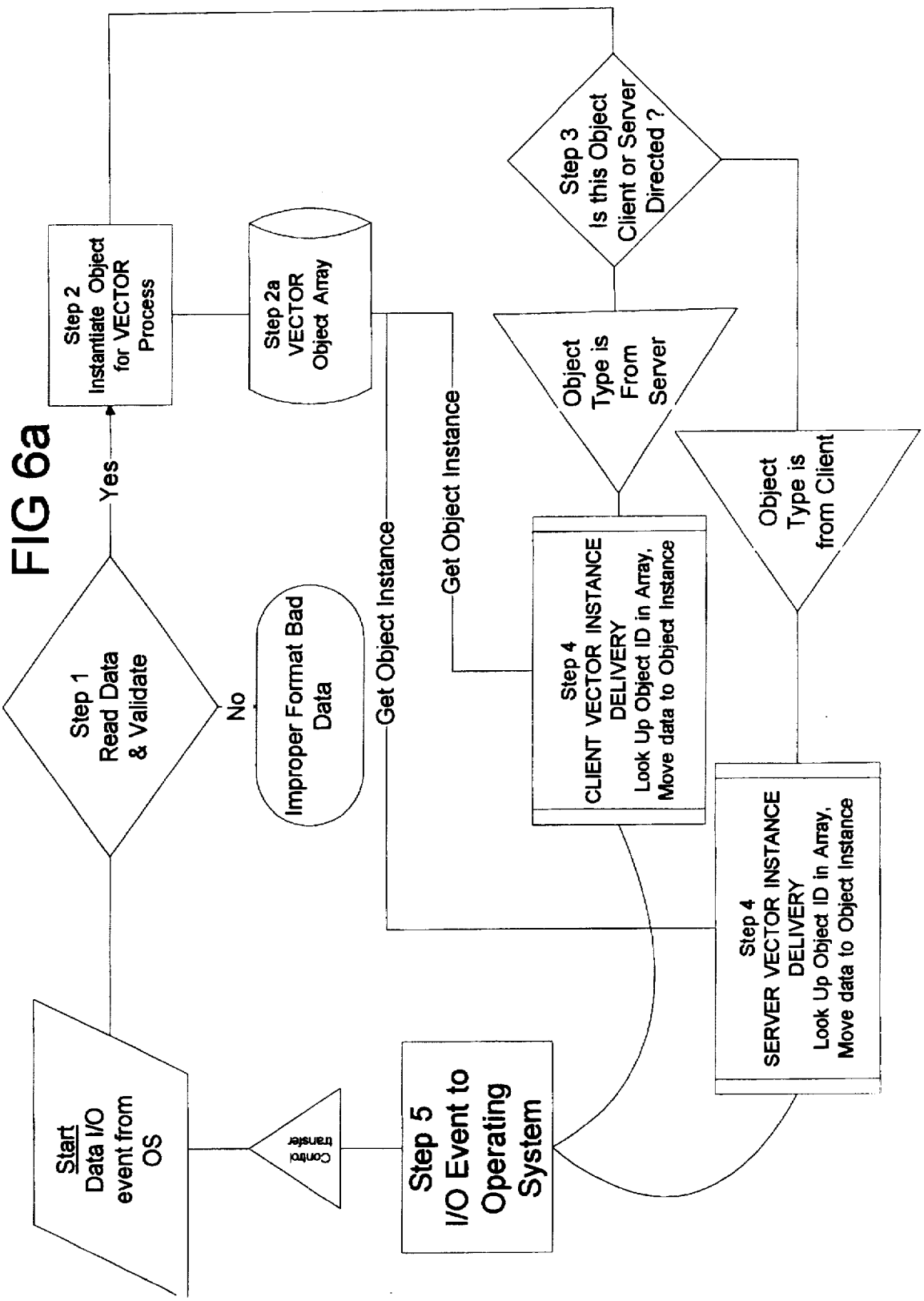

FIG 6c

MSG ID=1,VAPI_REG, byte, byte
MSG ID=2,VAPI_UNREG, byte, byte
MSG ID=3,VAPI_ANI_PENDING, long,char(16),char(16),byte,char(30)
MSG ID=4,VAPI_OUTCALL_STATUS, long,byte
MSG ID=5,VAPI_HOLD_STATUS, long, byte
MSG ID=6,VAPI_SUPV_STATUS, long,byte
MSG ID=7,VAPI_CONF_STATUS, long,byte
MSG ID=8,VAPI_AVAIL_STATUS, long,byte
MSG ID=9,VAPI_UNAVAIL_STATUS, long,byte
MSG ID=10,VAPI_LOGON_STATUS, long, byte, byte, short int, char(24)
MSG ID=63,VAPI_CALL_VIA_STATUS, long,char(24),byte

FIG 6d

MSG ID=66,VAPI_LOGON, long, char(16), byte, long,char(24)
MSG ID=67,VAPI_AGENT_AVAILABLE,long
MSG ID=68,VAPI_AGENT_UNAVAILABLE, long, short int
MSG ID=69,VAPI_LOGOFF, long
MSG ID=70,VAPI_OFF_HOOK, long
MSG ID=71,VAPI_ON_HOOK, long
MSG ID=72,VAPI_REQ_OUTCALL, long, char(16), byte, char(32)
MSG ID=73,VAPI_REQ_HOLD, long
MSG ID=74,VAPI_REQ_OFF_HOLD, long
MSG ID=75,VAPI_REQ_SUPV, long, short int
MSG ID=76,VAPI_ANSWER, long, char(16)
MSG ID=77,VAPI_REQ_CONF, long, char16)
MSG ID=78,VAPI_1ST_RING, long, char (16)
MSG ID=79,VAPI_RING_END, long, char (16)
MSG ID=80,VAPI_TRANS_CALL, long, char (16)
MSG ID=81,VAPI_CALL_VIA, long, char(16), byte, char(30), char(24)
MSG ID=82,VAPI_GET_GROUPS, long
MSG ID=83,VAPI_VIA_CONFIG, long, byte, char(5), char(4), char (24)
MSG ID=91,VAPI_TEL_ERROR, long
MSG ID=94,VAPI_NOCALL, long

FIG 6e

MSG ID=64,VAPI_REG_STATUS, byte, byte, short int, long
MSG ID=65,VAPI_UNREG_STATUS, byte, byte
MSG ID=90,VAPI_CIMPLEX, long, byte, long, short int, short int, char(16)
MSG ID=92,VAPI_IWS_ERROR, long
MSG ID=93,VAPI_CLIENT_OUTAGE,
MSG ID=86,VAPI_LISTEN, long
MSG ID=87,VAPI_CLONE_LOGOFF, long, short int
MSG ID=88,VAPI_CLONE_LOGON, long, char(16), byte, long, char(24)
MSG ID=89,VAPI_CLONE, long
MSG ID=100,VAPI_ALIVE, long
MSG ID=101,VAPI_LIC_LIMIT, long, char(16), byte, long

VIRTUAL TELEPHONY DATA MESSAGE SYSTEM AND PROCESS

FIELD OF INVENTION

This invention relates to telecommunications network management and in particular to private automatic branch exchange (PBX) systems referred to as Automatic Call Distributors (ACDs) and processes that improve the granularity of the telephony communications switching.

DESCRIPTION OF PRIOR ART

Private Automatic Branch Exchanges commonly referred to as PBX's are "switching" systems that establish and manage the interconnection of users across a transmission system. Early switches incorporated wiring logic to deliver and maintain a communications signal between two users. Current PBXs have evolved into electronically controlled switching systems based upon sets of instructions stored in the control unit of a PBX's memory referred to as Stored Program Controls (SPC), for the purpose of setting up and maintaining calls.

The PBX provides two critical functions in a company location; the control of the switch in the form of the Stored Program Controls, and the communications signal switching itself. The action of setting up or provisioning the "switching" of a signal between two points must precede the action of signal switching itself (see FIG. 1). A special purpose PBX called an Automatic Call Distributor (ACD) is the evolution of the SPC portion of the PBX signal switch.

Automatic Call Distributors are special purpose PBX systems that setup, deliver, and manage analog and digital data transmissions based upon real-time circuit inventory of the switch. Fundamentally, the ACD is programmed for the number of circuits to a public switch and the number and identification of every client station (telephone extensions) in the company. An ACD typically supports a reporting capability that is sufficient for post analysis and planning, but not for real-time querying between Stored Program Control Applications for the purpose of determining if there is a circuit available to setup for communications transmission.

The ACD requires stored program control logic so it can act when presented with a signaling event from another switch. The limitation of current ACDs is that all program logic for call setup must be contained within the ACD's memory unit. In multiple ACD networks only one ACD can be signaled to setup a circuit between two endpoints (see FIG. 2). If that ACD does not have a circuit available to establish the call, it cannot tell the signaling public switch where to signal to establish a connection. This limitation is the result of stored program controls being based within each ACD.

Separating the Stored Program Control module from the ACD and moving it to a central signal point, makes possible the ability for circuit switching between an "offering" public switch and a provisioned "group" of ACDs (see FIG. 3). The feasibility of separating Stored Program Control physically creates need for circuit process control data at the Stored Program Control point whenever it is offered a call. Process control data in the telecommunications area is switch signal data, which the ACD generates but does not deliver back to a distributed Stored Program Control point in real-time. Primarily because switch design makes the ACD/PBX's event driven at best to signals being presented to them, and then through their Stored Program Control modules. When signals are being presented to a remote point, this does not even represent an event state to the ACD and the need for a Virtual Telephony Data Message system.

SUMMARY OF THE INVENTION

The present telephony data message management system exposes event-driven telephony data to switch management applications for the purpose of delivering telecommunications transmissions. It overcomes the inability of the prior art to utilize telephony data in its Stored Program Control (SPC) module operations. It further increases the ability of the prior art to manage individuals because of event data for the individual station ID (telephone extension).

During processing, the message management system is passing telephony data between desktop clients and network based ACD applications in real-time. The process is one of accepting a data packet from either a computer telephony integration (CTI) device or a SPC supporting application and tagging the data for delivery to its counterpart. Every CTI message is destined for a SPC application and SPC applications can only send data to CTI clients through the virtual circuit management system.

All clients to the virtual circuit management system must identify themselves and be validated. Once validated the client is allowed to have data messages delivered to its application host. There is a specific message application programming interface (API) set utilized for the purpose of transmitting data. This message API set insures that unauthorized or invalid data will not potentially corrupt client systems integrity. Data messages are directional and the message set further insures that. Message IDs designate what direction they may travel, what processes need to be notified of their arrival, and what events the receiving process should initiate.

The Virtual Telephony Data Message System is a collection of like processes and data objects whose specific attributes are determined by when and where in the system the objects instances are created. These data objects and processes are implemented utilizing the principles of inheritance and persistence within the virtual circuit management system.

BRIEF DESCRIPTION OF THE DRAWINGS

FIG. 6a is a process flow block diagram of the Telephony Data Message process by Vector Objects.

FIG. 6c is the Telephony Data Message API set portion generated by PBX/ACD Stored Program Control Applications. The message names begin with the word VAPI which stands for Virtual Application Programming Interface FIG. 6d is the Telephony Message API set portion generated by Telephony Integrated Client Applications for Stored Program Control Server Applications. The message names begin with the word VAPI which stands for Virtual Application Programming Interface FIG. 6e is the message API set portion generated by Virtual Message Management System's inter-process communication. The message names begin with the word VAPI which stands for Virtual Application Programming Interface.

DETAILED DESCRIPTION OF THE PREFERRED EMBODIMENT

Figure 1:
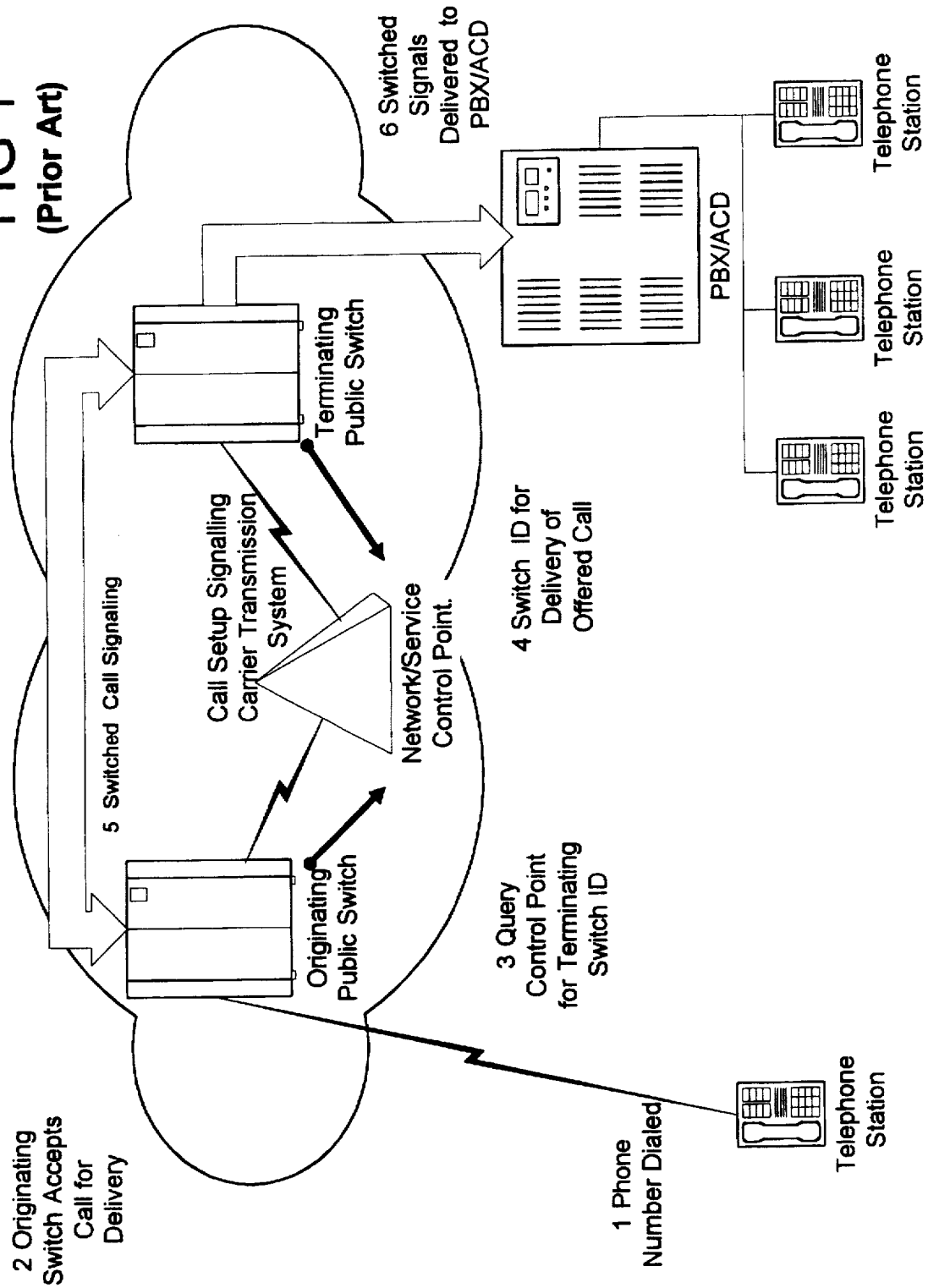
FIG. 1 is a representation of the components of Stored Program Control and switched signaling for an offered call in the prior art
Figure 2:
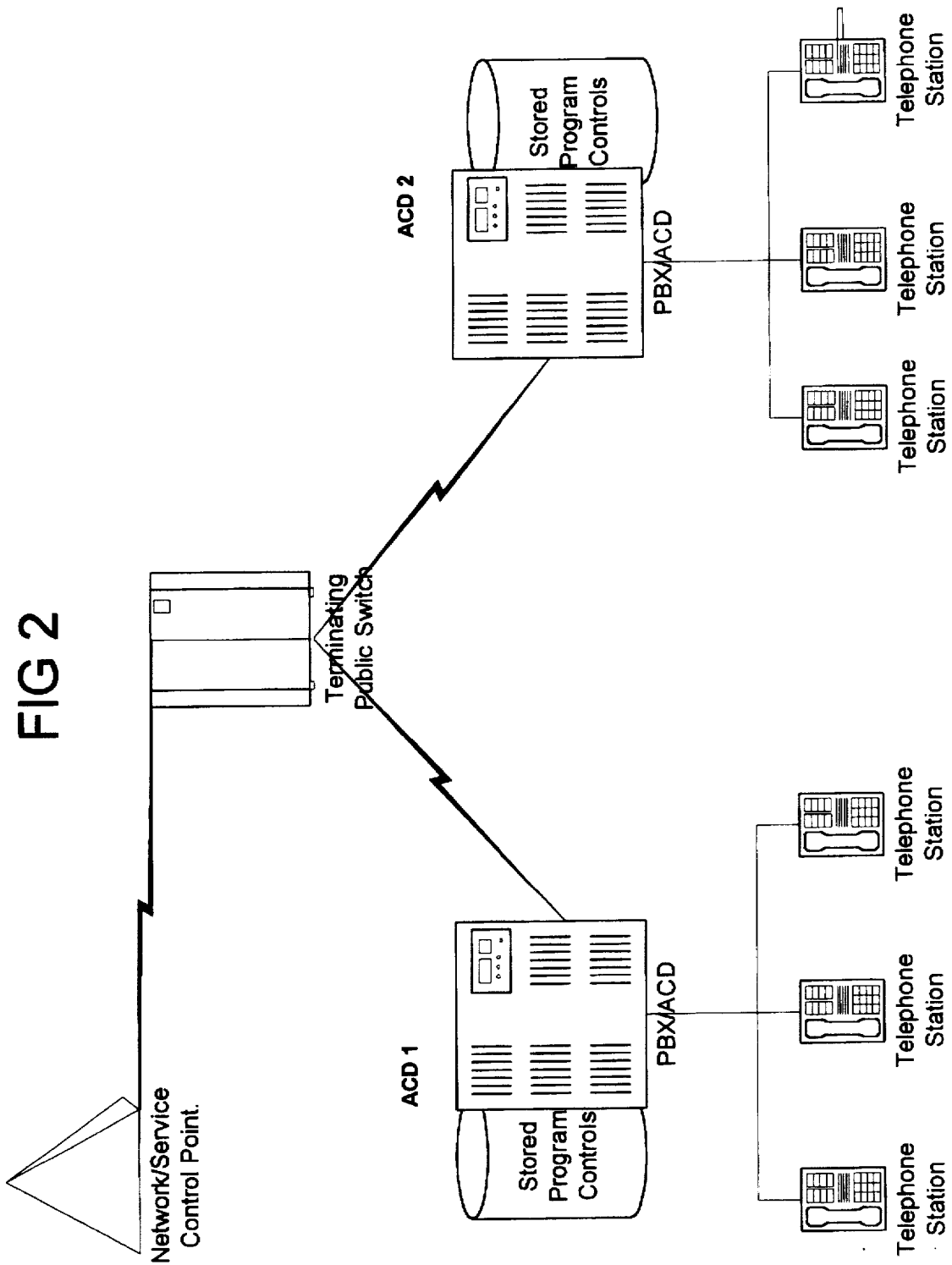
FIG. 2 is a representation of multiple PBX/ACDs with separate Stored Program Control being served by a single Public Switch
Figure 3:
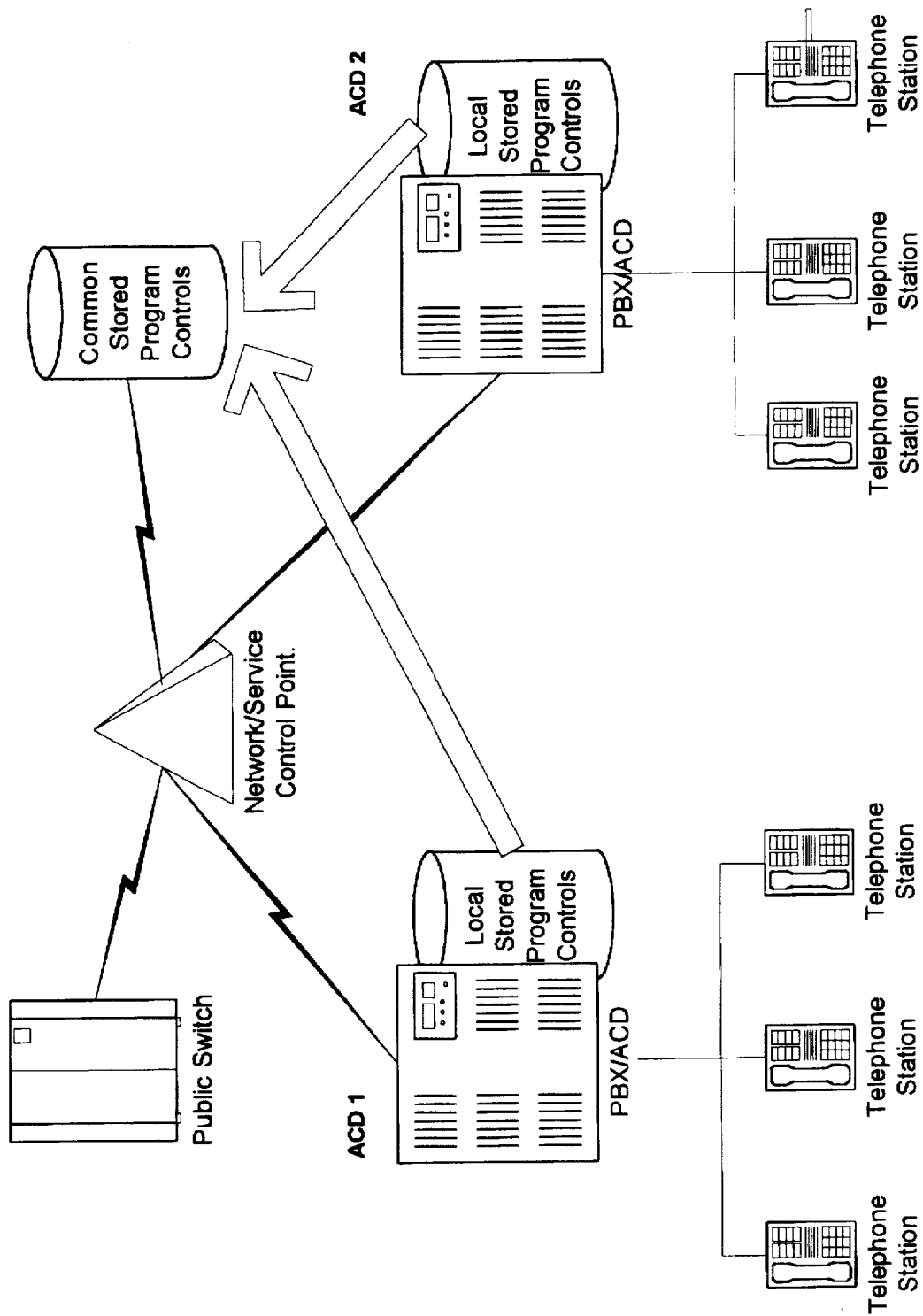
FIG. 3 is a representation of multiple PBX/ACDs utilizing a distributed Stored Program Controls module accessed by a carrier Service Control Point accessing a Common Stored Program Control.
Figure 4:
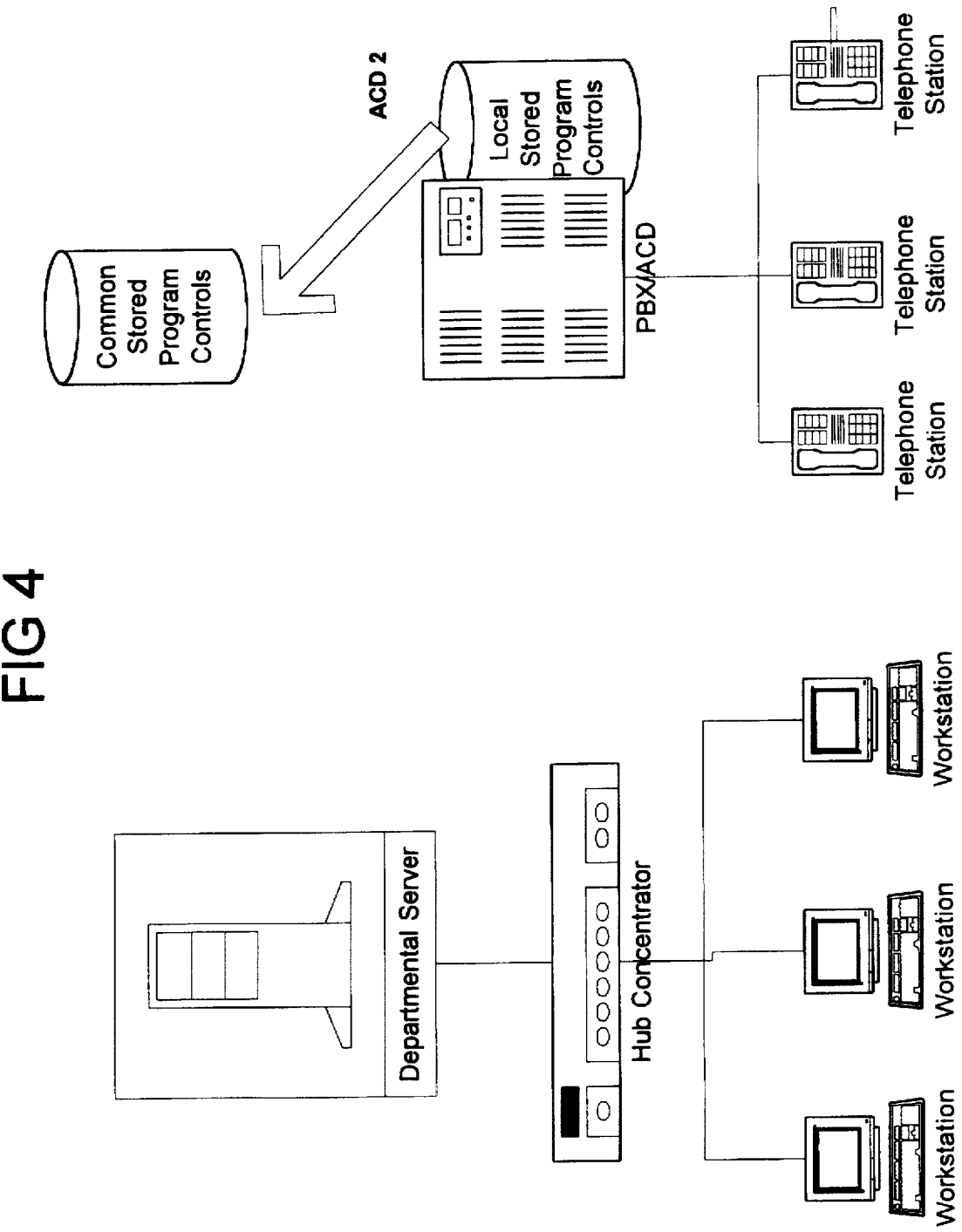
FIG. 4 is a representation of a conventional system without Computer Telephony Integration technology being combined with network based Stored Program Control modules.
Figure 5:
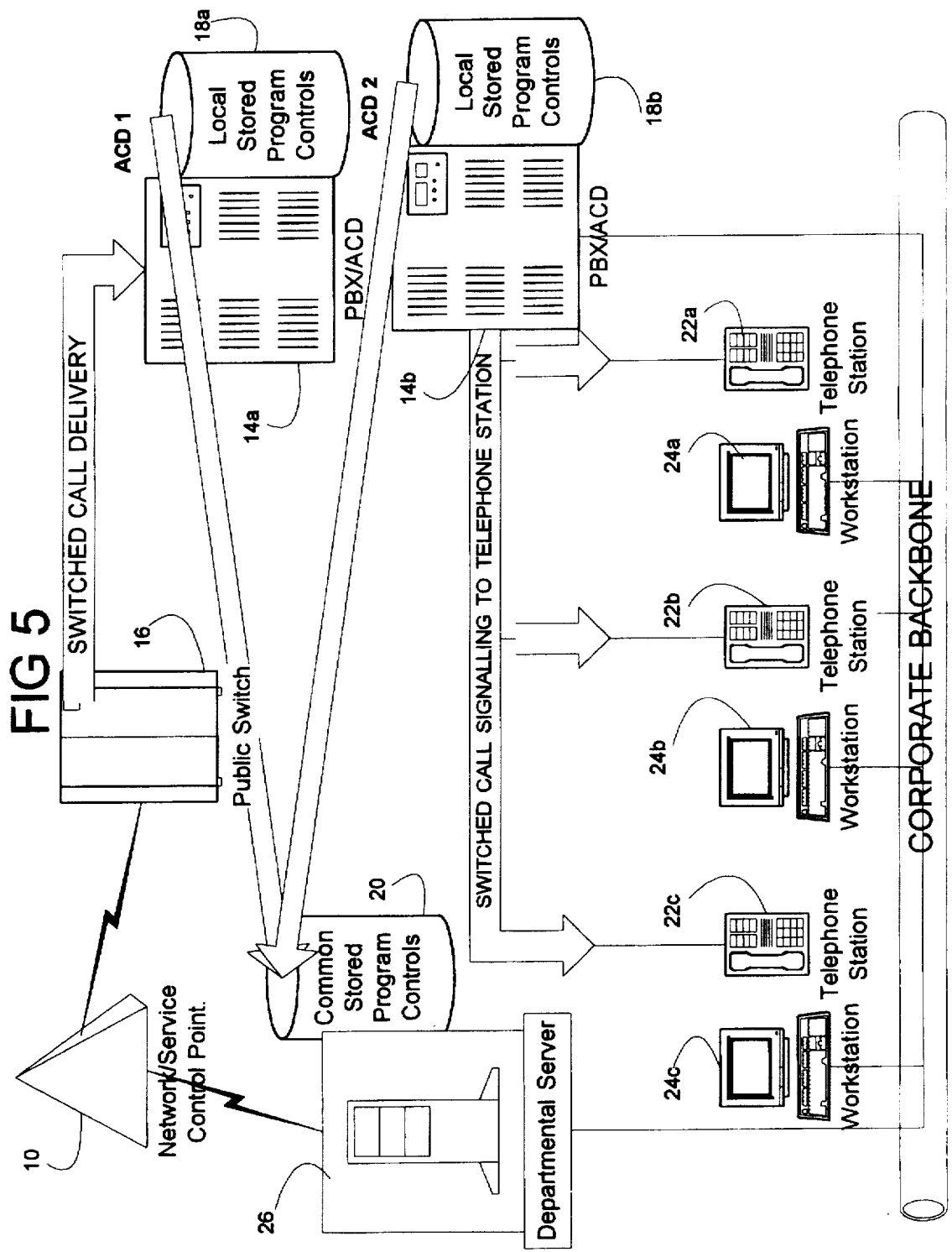
FIG. 5 is a representation of a Computer Telephony system utilizing a departmental server for distributed Common Stored Program Control functionality.

A present preferred embodiment of my system is depicted in FIG. 5 through FIG. 6e. In the preferred system there is a Computer Telephony Integrated Network utilizing a Departmental Server as a distributed server for ACD Stored Program Controls.

Referring to FIG. 5, a public communication system includes a network/service control point 10 and a message source 16, such as a terminating public switch. The message source 16 communicates with switching systems, such as PBX/ACDs 14a,14b. Although two PBX/ACD units 14a, 14b are shown in FIG. 5, it is to be understood that the system may contain additional PBX/ACD units 14. The PBX/ACD units 14 within the system may be at different physical locations.

Each PBX/ACD 14 includes a plurality of connection switches for electrically connecting the message source 16 with a communication station, such as a telephone station 22 or a work station 24. The workstations 24 may include personal computers or servers. Some of the workstations 24 and telephone stations 22 may be in a building or other physical location different from the building in which other workstations 24 and telephone stations 22 are located.

Each PBX/ACD 14 includes a local stored program control module 18. The local stored program control modules 18a,18b monitor the status of the connect switches within the respective PBX/ACD 14a,14b.

The local stored program control modules 18a,18b communicate with a common stored program control module 20. In particular, the local stored program control modules 18a,18b provide process control data to the common stored program control module 20 which may reside in server 26. The common stored program control module 20 may provide instructions to the network/service control point 10 for selectively connecting the message source 16 to at least one of the communication stations via a PBX/ACD 14.

Figure 6B:
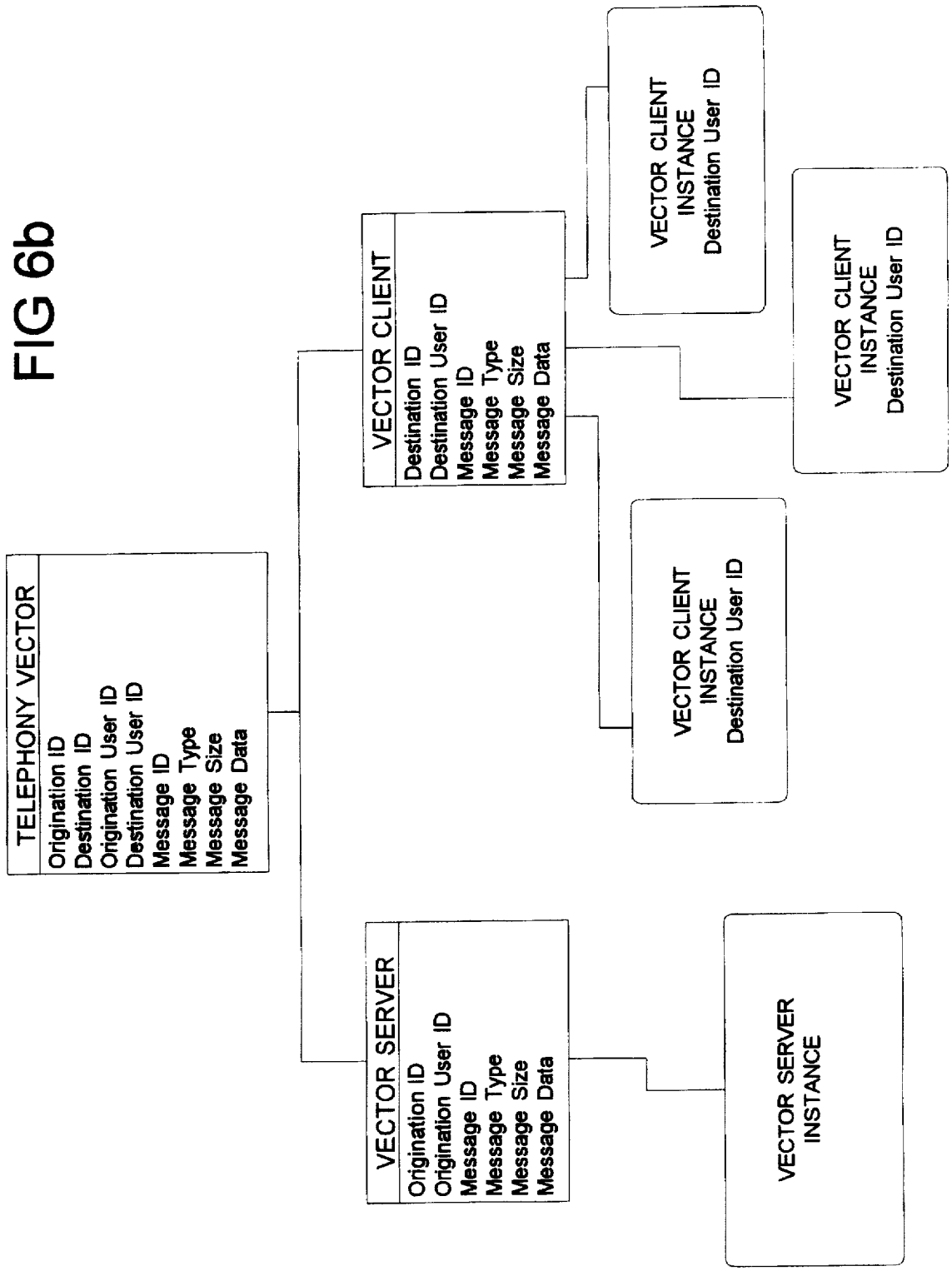
FIG. 6b is an Object Definition Model for the Telephony Vector Object.

The process of the present invention is shown in FIG. 6. In particular, a process flow block diagram of the Telephony Data Message process by Vector Objects is shown in FIG. 6a, and a Object Definition Model for the Vector Objects is shown in FIG. 6b, and the Message set application programming interface (API) is shown in FIG. 6c, FIG. 6d and FIG. 6e.

Both FIGS. 6a and 6b represent software modules in the preferred embodiment. The module of FIG. 6b is incorporated in the implementation of step 2 in FIG. 6a, the VECTOR Process, 2a, the VECTOR Object Array and step 4, the CLIENT and SERVER VECTOR INSTANCES. The implementation requires input data in the structures specified in the Message set application programming interface (API) of FIGS. 6c and 6d and 6e for step 1 of FIG. 6a and generates output data specified in the Message set application programming interface (API) for step 5 of FIG. 6a.

Those skilled in the art shall recognize that the values of all data elements in the Message set application programming interface (API) can be modified without affecting the basic concept behind the Virtual Telephony Data Messaging System in the present invention.

Referring to FIG. 6a step 1, reading data and performing validation is shown. The Operating System the Virtual Telephony Data Messaging program is running in will make data available for the program to read. Step 1 depicts a decision block, if the data read by the program structure matches the structure of data messages specified in the Message set application programming interface (API) that data will be moved by the program to Step 2 to create a Vector Object instance. If the data read does not match the structure specified in the Message set application programming interface (API) then discard the data and wait for the Operating System to notify the program with new data.

Referring to FIG. 6a step 2, Instantiate object for VECTOR process is shown. Data passed to this process is used to define the properties of an object instance. The process reads the data into a structure that defines what actions the resultant object can perform. An object instance once created can only perform based upon the attributes it contains. The VECTOR Object instance, once created is unique and is maintained by the program as a member of the Object array step 2a. All data read by the VECTOR Process has a logical identification number which is mapped to the VECTOR object array to determine if an instance already exists. New logical IDs generate VECTOR objects that perform the functions of writing output data. Data read for logical IDs that map to VECTOR object instances in the array generate VECTOR objects that are data containers only.

Referring to FIG. 6a step 3, a VECTOR object instance has been generated and it has to be validated to determine what delivery instructions the object contains. All data is in the form of object instances that contain origination IDs. The origination ID gives the object instance a source type attribute of either a CLIENT application or SERVER application. Each VECTOR object instance inherits a destination ID in this decision block. VECTOR object instances containing CLIENT origination IDs inherit a SERVER destination ID. VECTOR object instances containing SERVER origination IDs inherit a CLIENT destination ID. The destination ID inheritance moves the VECTOR object to the delivery process, step 4.

Referring to FIG. 6a step 4, both CLIENT VECTOR INSTANCE and SERVER VECTOR INSTANCE delivery process lookup up the VECTOR Object instance in the array with origination IDs that match the Destination IDs of the object instances in step 4. The VECTOR object instance inherits the action attributes of the instance that writes its data to the specific Destination ID. In the case that the Destination ID is no longer in the VECTOR Object array then the appropriate CLIENT or SERVER is no longer active.

Referring to FIG. 6a step 5, both CLIENT VECTOR INSTANCE and SERVER VECTOR INSTANCE processes write their data to an input/output process that notifies the operating system's Input Output layer to take delivery of the data.

The initiation and termination of the Virtual Telephony Data Messaging program is a matter of starting and stopping the process that reads the data from the operating system input/output layer. The operating system is responsible for the network layer, which insures both management and delivery of application data.

Them method described herein can be implemented in existing telecommunication systems having a computer and a PBX/ACD or similar telephone switching device that is or can be connected to the computer. To do this a computer program for implementing the method is provided on a disk or other computer readable medium and loaded into the computer. The program contains the instructions for applying vectors to the messages, creating object instances and otherwise enabling the computer to communicate with the telephone switching device to install and utilize the method.

The invention has been described in a preferred embodiment and complemented with supporting diagrams, but is not limited thereto. Those skilled in the art will recognize that a number of additional modifications and improvements can be made to the invention without departure from the essential spirit and scope. The scope of the invention should only be limited by the appended set of claims.

I claim:

1. A system for facilitating the transmission of telephony communications data between a message source and a plurality of communication stations, comprising:
   a. at least one switching system having a plurality of connection switches coupled with said message source, and containing a local stored program control module for monitoring the status of said connection switches therein;
      each of said communication stations being coupled with at least one of said connection switches;
      said connection switches being able to connect selected ones of said communication stations with said message source; and
   b. a common stored program control module coupled with said local stored program module in said at least one switching system;
      said common stored program control module residing within a server for receiving information regarding said connection switches from said local stored program module and providing instructions to a network/service control point for selectively connecting said message source to at least one of said communication stations.

2. The system of claim 1 wherein each of said switching systems is a Private Branch Exchange.

3. The system of claim 2 wherein said Private Branch Exchange is an Automatic Call Distributor.

4. The system of claim 1 wherein each of said communication stations comprises one of a telephone station and a workstation.

5. The system of claim 4 wherein each said workstation comprises one of a personal computer and a server.

6. The system of claim 1 wherein said information comprises process control data.

7. The system of claim 1 wherein said message source comprises a public switch.

8. A method for transferring messages in a telephone system of the type containing a plurality of communication stations and at least one switch connected to the communication stations, the at least one switch containing at least one control program for directing each received message to a selected communication station according to content of the message comprising the steps of:
   a. receiving a message having a message structure from a message source;
   b. comparing the message structure to a predetermined message structure and determining if the message structure matches the predetermined message structure;
   c. if the message structures do not match rejecting the message and if the messages structures do match accepting the message and applying an object instance to the message;
   d. determining the communication station to which the message is directed;
   e. applying a vector to the message;
   f. creating at least one object instance for each communication station the object instance containing information about the communication station;
   g. matching the vector applied to the message with the object instance associated with the communication station to which the message is directed; and
   h. directing the message to a communication station in accordance with the information in the object instance associated with the communication station to which the message is directed.

9. The method of claim 8 also comprising the steps of monitoring each communication station and updating the object instances according to changes in status of the communication stations.

10. The method of claim 8 wherein each object instance contains status information about the associated communication station.

11. The method of claim 8 each object instance contains a user identification.

12. The method of claim 8 wherein the vector contains information selected from the group consisting of Origination ID, Destination ID, Origination User ID, Destination Used ID, Message ID, Message Type, Message Size and Message Data.

13. The method of claim 8 wherein the message contains a sender identification also comprising step of comparing the sender identification to a list of authorized user identifications and rejecting the message if the sender identification is not on the list of authorized user identifications.

14. The method of claim 8 wherein the message contains data corresponding to a voice communication.

15. A computer readable medium containing a program for directing messages in a telephone system of the type containing a plurality of communication stations and at least one switch connected to the communication stations, the program containing a predetermined message structure and receiving a message having a message structure from a message source and performing the following steps;
   a. comparing the message structure to the predetermined message structure and determining if the message structure matches the predetermined message structure;
   b. if the message structures do not match rejecting the message and if the messages structures do match accepting the message and applying an object instance to the message;
   c. determining the communication station to which the message is directed;
   d. applying a vector to the message;
   e. creating at least one object instance for each communication station, the object instance containing information about the communication station;
   f. matching the vector applied to the message with the object instance associated with the communication station to which the message is directed; and
   g. directing the message to a communication station in accordance with the information in the object instance associated with the communication station to which the message is directed.

16. A system for facilitating the transmission of telephony communications data between a message source and a plurality of communication stations, comprising:

a. at least one switching system having a plurality of connection switches coupled with said message source, and containing a local stored program control module for monitoring the status of said connection switches therein;

each of said communication stations being coupled with at least one of said connection switches;

said connection switches being able to connect selected ones of said communication stations with said message source; and b. a common stored program control module coupled with said local stored program module in said at least one switching system;

said common stored program control module for receiving information regarding said connection switches from said local stored program module and providing instructions to a network/service control point for selectively connecting said message source to at least one of said communication stations, wherein each of said communication stations comprises one of a telephone station, a workstation, a personal computer and a server.

17. The system of claim 16 wherein each of said switching systems is a Private Branch Exchange.

18. The system of claim 17 wherein said Private Branch Exchange is an Automatic Call Distributor.

19. The system of claim 16 wherein said information comprises process control data.

20. The system of claim 16 wherein said message source comprises a public switch.

* * * * *